UNITED STATES PATENT OFFICE.

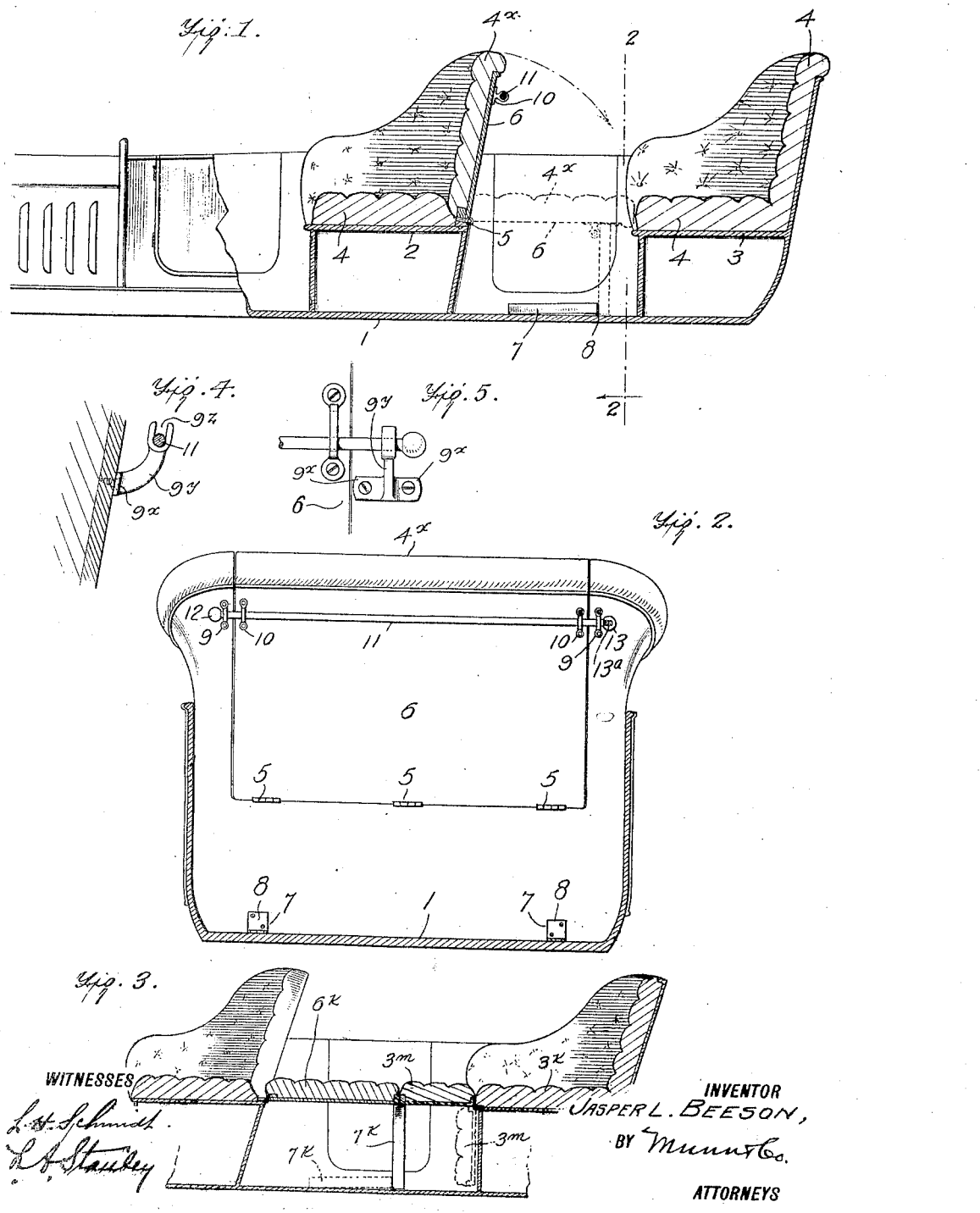

JASPER LUTHER BEESON, OF MILLEDGEVILLE, GEORGIA.

HINGED SEAT FOR VEHICLES.

1,097,512.

Specification of Letters Patent. Patented May 19, 1914.

Application filed August 6, 1912. Serial No. 713,544.

*To all whom it may concern:*

Be it known that I, JASPER L. BEESON, a citizen of the United States, and a resident of Milledgeville, in the county of Baldwin and State of Georgia, have made certain new and useful Improvements in Hinged Seats for Vehicles, of which the following is a specification.

My invention relates to improvements in hinged seats for vehicles, especially for automobiles, and it consists in the combinations, constructions, and arrangements herein described and claimed.

An object of my invention is to provide a device which serves as the back of the front seat of the vehicle, and which may be let down so as to transform the front and rear seats into a bed.

A further object of my invention is to provide a simple device for the purpose described which may be used for camping purposes, and which when replaced in its normal position will have the appearance of a seat of the ordinary construction.

A further object of my invention is to provide means for holding the hinged back in its normal position, said means also serving as a handle for the occupants of the rear seat.

Other objects and advantages will appear in the following specification, and the novel features of the device will be particularly pointed out in the appended claims.

My invention is illustrated in the accompanying drawings forming part of this application in which—

Figure 1 is a longitudinal section through the front and rear seats, showing the use of the invention, Fig. 2 is a section along the line 2—2 of Fig. 1, showing a rear view of the back of the front seat, Fig. 3 is a view of a modified form of the device, Fig. 4 is a face view of a modified form of bracket, and Fig. 5 is a side view of the bracket shown in Fig. 4.

In carrying out my invention I make use of any vehicle, such as an automobile. In Fig. 1, the floor of the body of such a vehicle is shown at 1, the front seat at 2, the rear seat at 3. Both the rear seat and the front seat have upholstery 4, which may be of any suitable material.

Hinged to the front seat at 5 is a back 6, which has upholstery $4^x$ similar to that shown at 4. As will be seen from the drawings the back 6 is designed to swing downwardly and rearwardly, so as to bring the upholstered portion $4^x$ in alinement with the upholstered portion 4 of the front and rear seats. In order to support the back 6 in its horizontal position I provide the supports 7 of any suitable material, which are hinged at 8 to the bottom 1 of the vehicle body. These are designed to be raised into the dotted line position shown in Fig. 1, so as to support the back.

At the rear of the front seat are secured brackets having eyes 9 arranged to register with similar eyes 10 on the hinged back 6. A rod 11 is provided with a knob 12, and a similar knob 13 at the other end. Either of these knobs, or both of them, may be screwed onto the rod 11, as shown at $13^a$. The rod 11 may be passed through the registering eyes, so as to hold the seat back 6 in its normal position.

From the foregoing description of the various parts of the device the operation thereof may be readily understood.

When the vehicle is to be used for pleasure the seat back 6 may be secured as described. The appearance of the seat back 6, from the rear is that shown in Fig. 2. The rod 11 forms a hand hold for the occupants of the rear seat 3, and to passersby or to any one who does not closely examine the device, the seat has the appearance of the ordinary front seat of an automobile. If it is desired to convert the seats into a bed for sleeping purposes or to use the car as an ambulance, it is only necessary to unscrew one of the knobs such as $13^a$, withdraw the rod 11, raise the supports 7 into the position shown in dotted lines in Fig. 1, and to let the seat back 6 downwardly upon it. I preferably place the rod 11 in such a position that it will engage the supports 7 on one side thereof. This locks the board 7 in position, for it will be apparent that it cannot swing forwardly on account of engagement with the rod, and it cannot swing rearwardly because of the engagement of the square edge with the floor. There is therefore no danger of the supports 7 being shifted. This forms a bed or couch, which is ready for sleeping purposes.

In Fig. 3 I have shown a modified form of the device, which is applicable to large touring cars. In this form of the device the backing $6^k$ is designed to swing downwardly and to rest upon supports such as that shown at $7^k$ which are hinged on each side to the sills of the body. The rear seat $3^k$ is provided with a hinged member $3^m$ which is upholstered. This member is arranged to swing upwardly so as to rest on the supports $7^k$, thereby making a flat bed of the back and front seat, the member $3^m$ and the seat $3^k$.

I may also use a form of bracket shown in Figs. 4 and 5. In these figures the base portion $9^x$ is arranged to be secured to the back of the front seat. There is a portion $9^y$ which projects outwardly and upwardly, and which is slotted at $9^z$ to receive the rod 11. When this form of bracket is used in lieu of the brackets 9 in Fig. 2, it will be apparent that it will be only necessary to raise the rod out of the slotted end of the brackets in order to permit the seat to swing downwardly. In this form of the device the eyes 10 are made large enough so that the rod may have enough play to clear the ends of the slotted eyes $9^z$. This will permit the back to swing down without withdrawing the rod from the eyes 10 and hence will not necessitate getting out of the vehicle to let down the seat.

I claim:

1. The combination with the front and rear seats of a vehicle, of a back hinged to said front seat, means for locking said back in its normal position, said means comprising a plurality of registering brackets on said back and the frame of the seat, said brackets having alined eyes, and a rod arranged to extend through said alined eyes, a pair of rigid supports hinged at one end to the bottom of the vehicle and arranged to swing rearwardly into vertical position for supporting the back of the front seat in a horizontal position, said supports being locked in position by the engagement of said rod with the upper ends of the supports.

2. The combination with the front and rear seats of a vehicle, of a back hinged to said front seat, means for locking said back in its normal position, said means comprising a plurality of registering brackets on said back and the frame of the seat, said brackets having alined eyes and a rod arranged to extend through said alined eyes, a pair of rigid supports hinged at one end to the bottom of the vehicle and arranged to swing rearwardly into vertical position for supporting the back of the front seat in a horizontal position, the hinge for each vertical support being on one side of the support, and the engagement of the opposite side of the hinged end of the support with the floor of the vehicle serving to prevent the movement of the support beyond its vertical position, each of said supports being prevented from swinging on their hinges when the front seat is in a horizontal position by the engagement of said rod with the upper ends of the supports.

JASPER LUTHER BEESON.

Witnesses:
H. L. HAUGHTON,
GILES DUNN.